United States Patent [19]

Nishizawa et al.

[11] Patent Number: 4,984,080
[45] Date of Patent: Jan. 8, 1991

[54] VIDEO IF SIGNAL DETECTOR

[75] Inventors: Yukio Nishizawa, Kawaguchi; Kazuo Urata, Noda, both of Japan

[73] Assignee: Victor Company of Japan, Ltd., Japan

[21] Appl. No.: 453,272

[22] Filed: Dec. 18, 1989

[30] Foreign Application Priority Data

Dec. 27, 1988 [JP] Japan .................................. 63-331348

[51] Int. Cl.$^5$ .......................... H04N 5/14; H04N 5/44
[52] U.S. Cl. ..................................... 358/160; 358/188
[58] Field of Search ................. 358/160, 188, 197, 198

[56] References Cited

U.S. PATENT DOCUMENTS

| | | | |
|---|---|---|---|
| 4,253,118 | 2/1981 | Flasza | 358/188 |
| 4,323,924 | 4/1982 | Flasza | 358/188 |
| 4,524,389 | 6/1985 | Isobe et al. | 358/188 |
| 4,811,096 | 3/1989 | Gakumura | 358/188 |
| 4,933,767 | 6/1990 | Hyakutake | 358/198 |

Primary Examiner—John W. Shepperd
Assistant Examiner—Michael D. Parker
Attorney, Agent, or Firm—Lowe, Price, LeBlanc, Becker & Shur

[57] ABSTRACT

A video IF signal detector includes a first phase detector detecting a phase difference between an input video IF a signal and a first reference signal. A low pass filter acts on an output signal from the first phase detector. A VCO generates the first reference signal and a second reference signal in response to an output signal from the low pass filter. The first reference signal and the second reference signal have a fixed phase relation with each other. The first phase detector, the low pass filter, and the VCO compose a PLL. A second phase detector detects a phase difference between the input vido IF signal and the second reference signal and extracts a baseband video signal from the input video IF signal. The PLL is enabled during a first period where the input video IF signal is independent of display information. The PLL is disabled during a second period where the input video IF signal represents the display information.

6 Claims, 7 Drawing Sheets

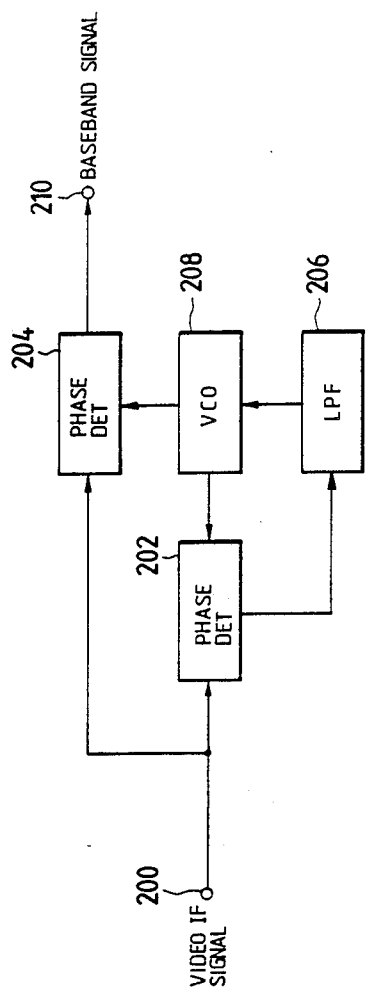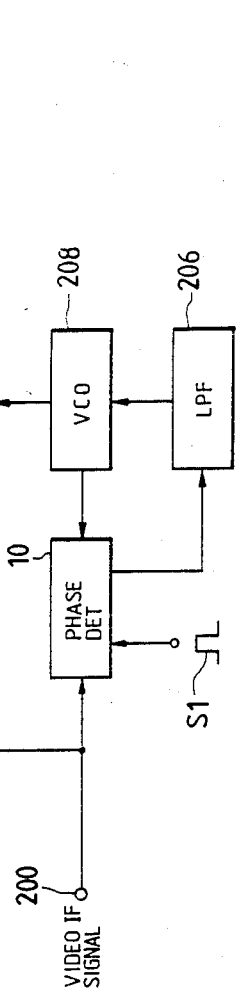

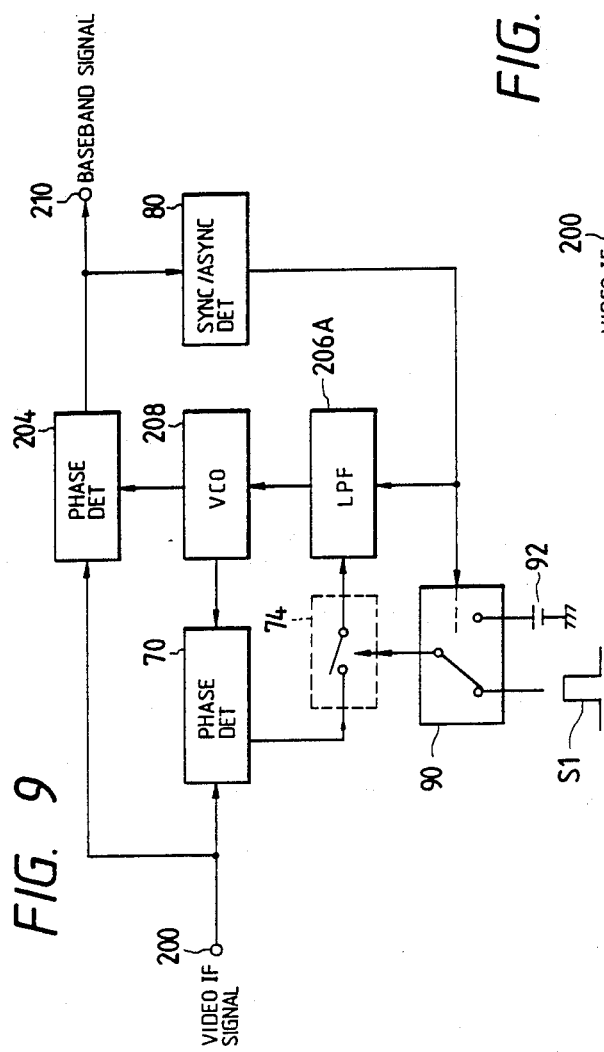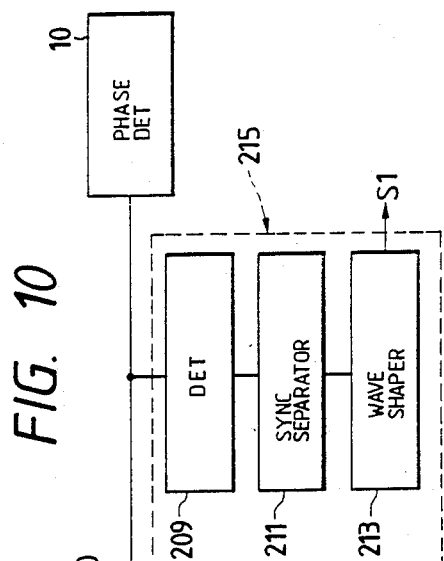

VIDEO IF SIGNAL DETECTOR

BACKGROUND OF THE INVENTION

This invention relates to a video IF (Intermediate Frequency) signal detector.

Video IF signal detectors extract baseband components from a video IF signal. As will be explained later, a prior-art video IF signal detector has a problem in the fidelity or accuracy.

SUMMARY OF THE INVENTION

It is an object of this invention to provide an accurate video IF signal detector.

According to this invention, a video IF signal detector includes a first phase detector detecting a phase difference between an input video IF signal and a first reference signal. A low pass filter acts on an output signal from the first phase detector. A VCO generates the first reference signal and a second reference signal in response to an output signal from the low pass filter. The first reference signal and the second reference signal have a fixed phase relation with each other. The first phase detector, the low pass filter, and the VCO compose a PLL. A second phase detector detects a phase difference between the input video IF signal and the second reference signal and extracts a baseband video signal from the input video IF signal. The PLL is enabled during a first period where the input video IF signal is independent of display information. The PLL is disabled during a second period where the input video IF signal represents the display information.

BRIEF DESCRIPTION OF THE DRAWINGS

FIG. 1 is a block diagram of a prior-art video IF signal detector.

FIG. 2 is a block diagram of a video IF signal detector according to a first embodiment of this invention.

FIG. 9 is a block diagram of a video IF signal detector according to a fourth embodiment of this invention.

FIG. 10 is a block diagram of a circuit for generating a pulse signal S1 in the video IF signal detector of FIG. 2.

Like and corresponding elements are denoted by the same reference characters throughout the drawings.

DESCRIPTION OF THE PRIOR ART

Figure 3:
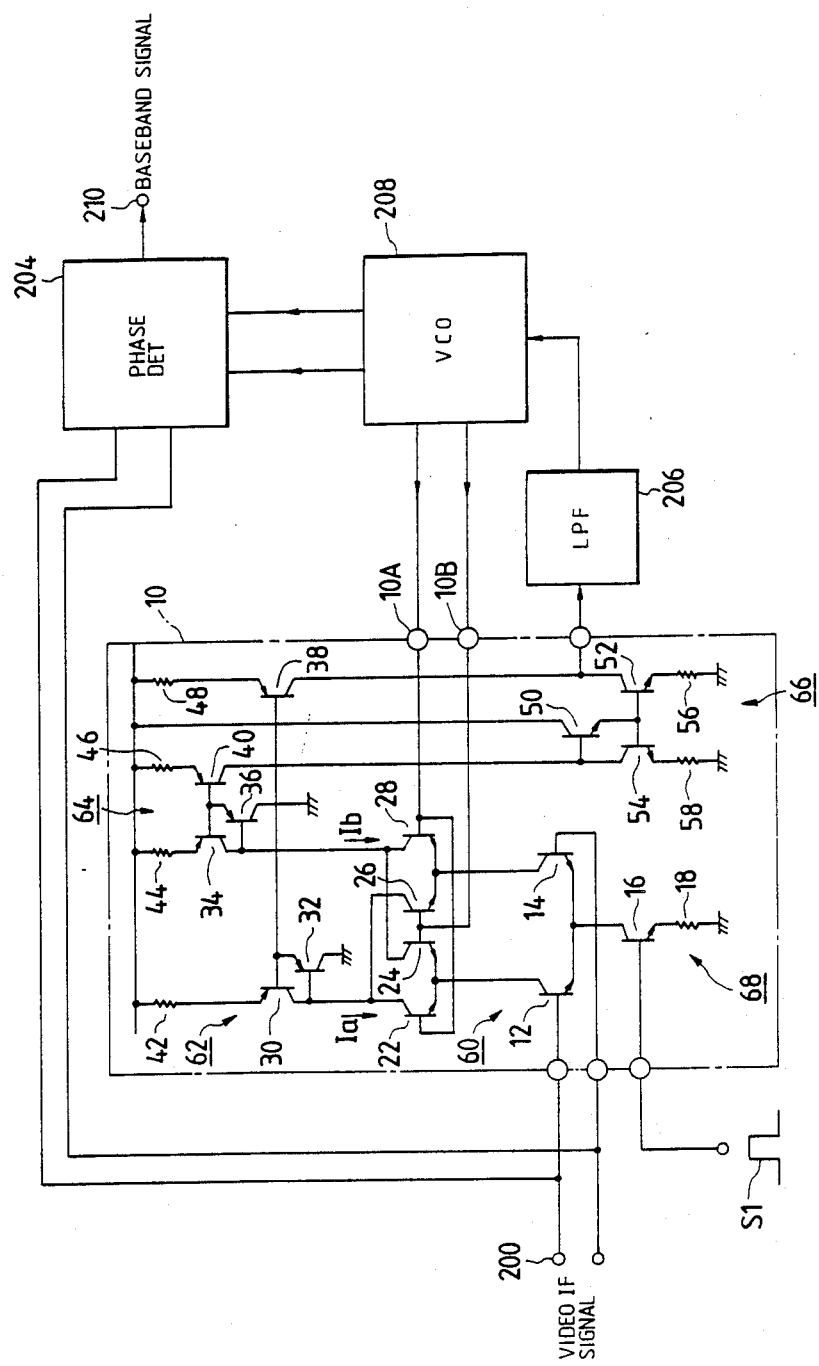
FIG. 3 is a diagram of the video IF signal detector of FIG. 2.

Before the detailed description of this invention, a prior-art video IF signal detector will be described for a better understanding of this invention.

As shown in FIG. 1, a prior-art video IF signal detector includes phase detectors 202 and 204. A video IF signal is fed to first input terminals of the phase detectors 202 and 204 via an input terminal 200 of the video IF signal detector. The output terminal of the phase detector 202 is connected to an input terminal of a voltage-controlled oscillator (VCO) 208 via a low pass filter (LPF) 206. The VCO 208 outputs first and second reference signals to second input terminals of the phase detectors 202 and 204 respectively. The first and second reference signals have a quadrature relation with each other. The frequency of the first and second reference signals agrees with the oscillation frequency of the VCO 208. The output terminal of the phase detector 204 is connected to an output terminal 210 of the video IF signal detector.

The prior-art video IF signal detector of FIG. 1 operates as follows. The phase detector 202 detects a phase difference between the video IF signal and the first reference signal, and outputs a detection signal dependent upon the detected phase difference. The LPF 206 removes high-frequency components from the detection signal and outputs a VCO control signal whose level accurately varies as a function of the detected phase difference between the video IF signal and the first reference signal. The VCO control signal is fed to the VCO 208.

The oscillation frequency of the VCO 208 varies in accordance with the VCO control signal. In other words, the VCO 208 controls the frequency of the first reference signal in response to the VCO control signal. The phase detector 202, the LPF 206, and the VCO 208 form a phase-locked loop (PLL) which functions to lock the frequency of the first reference signal to a carrier frequency of the video IF signal.

Since the first and second reference signals have the quadrature relation with each other, the frequency of the second reference signal is also locked to the carrier frequency of the video IF signal. The phase detector 204 demodulates the video IF signal through phase detection using the second reference signal, so that baseband components are extracted from the video IF signal. The phase detector 204 outputs the baseband components to the output terminal 210.

The quadrature relation between the first and second reference signals is to maximize the level of the output baseband components when the phase of the video IF signal carrier coincides with the second reference signal.

The output baseband components can be completely accurate if the oscillation of the VCO 208 is determined only by the phase of the video IF signal carrier. However, in the prior-art video IF signal detector of FIG. 1, it is generally impossible that the oscillation of the VCO 208 follows only the phase of the video IF signal carrier, and therefore the output baseband components tend to be somewhat inaccurate. This results for the following reason. A video IF signal has high-frequency and low-frequency components representing display information. In general, the display information is moving so that such display information components are varying. Since the influence of the low-frequency display information components passes to the VCO 208 through the phase detector 202 and the LPF 206, the oscillation phase of the VCO 208 is varied by changes in the low-frequency display information components. As a result, the oscillation of the VCO 208 can not follow only the phase of the video IF signal carrier.

DESCRIPTION OF THE FIRST PREFERRED EMBODIMENT

With reference to FIG. 2, a video IF signal detector according to a first embodiment of this invention includes phase detectors 10 and 204. A video IF signal is fed to first input terminals of the phase detectors 10 and 204 via an input terminal 200 of the video IF signal detector. The output terminal of the phase detector 10 is connected to an input terminal of a voltage-controlled oscillator (VCO) 208 via a low pass filter (LPF) 206. The VCO 208 outputs first and second reference signals to second input terminals of the phase detectors 10 and 204 respectively. The first and second reference signals have a quadrature relation with each other. The frequency of the first and second reference signals agrees with the oscillation frequency of the VCO 208. The output terminal of the phase detector 204 is connected to an output terminal 210 of the video IF signal detector.

The phase detector 10 is enabled and disabled in response to a pulse signal S1 representing retrace (flyback) periods related to the input video IF signal. Specifically, during retrace periods, the phase detector 10 remains enabled. During other periods, the phase detector 10 remains disabled.

The video IF signal detector of FIG. 2 operates as follows. The phase detector 10 detects a phase difference between the video IF signal and the first reference signal, and outputs a detection signal dependent upon the detected phase difference. The LPF 206 removes high-frequency components from the detection signal and outputs a VCO control signal whose level accurately varies as a function of the detected phase difference between the video IF signal and the first reference signal. The VCO control signal is fed to the VCO 208.

The oscillation frequency of the VCO 208 varies in accordance with the VCO control signal. The phase detector 10, the LPF 206, and the VCO 208 form a phase-locked loop (PLL) which functions to lock the frequency of the first reference signal to a carrier frequency of the video IF signal.

Since the first and second reference signals have the quadrature relation with each other, the frequency of the second reference signal is also locked to the carrier frequency of the video IF signal. The phase detector 204 demodulates the video IF signal through phase detection using the second reference signal, so that baseband components are extracted from the video IF signal. The phase detector 204 outputs the baseband components to the output terminal 210.

The quadrature relation between the first and second reference signals is to maximize the level of the output baseband components when the phase of the video IF signal carrier coincides with the second reference signal.

In general, during retrace periods, the level of the video IF signal remains maximized and the phase of the video IF signal is kept in exact agreement with the phase of the carrier of the video IF signal. During other periods, the video IF signal varies in response to changes in the contents of the display information. In this way, during the retrace periods, the video IF signal remains fixed independent of variations in the contents of the display information. As described previously, the phase detector 10 remains enabled during the retrace periods but remains disabled during other periods. Therefore, the output signal from the phase detector 10 and also the VCO control signal are held independent of variations in the contents of the display information. During the retrace periods, the phases of the first and second reference signals from the VCO 208 are controlled in accordance with the video IF signal carrier. During the other periods, the first and second reference signals from the VCO 208 are fixed to oscillation phases determined during the retrace periods. Thus, the oscillation of the VCO 208 is determined only by the phase of the video IF signal carrier, and the output baseband components from the phase detector 204 are accurate.

As shown in FIG. 3, the phase detector 10 includes transistors 12 and 14 composing a differential amplifier. The bases of the transistors 12 and 14 are connected to the input terminal 200. The video IF signal is applied between the bases of the transistors 12 and 14. The emitters of the transistors 12 and 14 are connected in common to the collector of the transistor 16. The base of the transistor 16 is subjected to the pulse signal S1. During the retrace periods, the pulse signal S1 remains at an H-level. During the other periods, the pulse signal S1 remains at an L-level. The emitter of the transistor 16 is grounded via a resistor 18.

The collector of the transistor 12 is connected to both of the emitters of transistors 22 and 24 composing a differential amplifier. The collector of the transistor 14 is connected to both of the emitters of transistors 26 and 28 composing a differential amplifier. The bases of the transistors 22 and 28 are connected in common to a reference signal input terminal 10A. The bases of the transistors 24 and 26 are connected in common to another reference signal input terminal 10B. The first reference signal from the VCO 208 is applied between the reference signal input terminals 10A and 10B.

The collectors of the transistors 22 and 26 are connected in common to the collector of a transistor 30 and the base of a transistor 32. The collectors of the transistors 24 and 28 are connected in common to the collector of a transistor 34 and the base of a transistor 36.

The base of the transistor 30 is connected to the emitter of the transistor 32 and the base of a transistor 38. The base of the transistor 34 is connected to the emitter of the transistor 36 and the base of a transistor 40. The emitters of the transistors 30, 34, 38, and 40 are connected to a positive power supply line via resistors 42, 44, 46, and 48 respectively.

The positive power supply line is directly connected to the collector of a transistor 50. The collector of the transistor 38 is connected to the collector of a transistor 52. The collector of the transistor 40 is connected to the collector of a transistor 54. The emitters of the transistors 52 and 54 are grounded via resistors 56 and 58 respectively. The bases of the transistors 52 and 54 are connected in common to the emitter of the transistor 50. The collector of the transistor 52 is connected to the input terminal of the LPF 206. The output signal from the phase detector 10 is generated at the collector of the transistor 52 and is applied to the input terminal of the LPF 206.

The differential amplifier composed of the transistors 22 and 24, and the differential amplifier composed of the transistors 26 and 28 constitute a switching circuit. This switching circuit forms a known phase detecting circuit 60 in conjunction with the differential amplifier composed of the transistors 12 and 14. Detection outputs from the phase detecting circuit 60 are collector currents Ia and Ib having opposite phases.

The transistors 30, 32, and 38, and the resistors 42 and 48 compose a first current Miller circuit 62. The transistors 34, 36, and 40, and the resistors 44 and 46 compose a second current Miller circuit 64. The transistors 50, 52, and 54, and the resistors 56 and 58 compose a third current Miller circuit 66.

The phase detecting circuit 60 is connected to a control switch 68 composed of the transistor 16 and the resistor 18. The control switch 68 changes the operation of the phase detecting circuit 60 between an active mode (an enabled mode) and a rest mode (a disabled mode) in response to the pulse signal S1. During the retrace periods, the phase detecting circuit 60 is enabled. During the other periods, the phase detecting circuit 60 is disabled.

The phase detecting circuit 60 performs phase detection by multiplying the video IF signal and the first reference signal. As described previously, the phase detection outputs from the phase detecting circuit 60 are the oppose-phase collector currents Ia and Ib. The detection current signal Ia is transmitted to the LPF 206 via the first current Miller circuit 62. The other detection current signal Ib is transmitted to the LPF 206 via the second and third current Miller circuits 64 and 66.

During the retrace periods, the pulse signal S1 remains at the H-level so that the transistor 16 of the control switch 68 is kept conductive. When the transistor 16 is conductive, the phase detecting circuit 60 is enabled to generate the detection signal currents Ia and Ib. During the other periods, the pulse signal S1 remains at the L-level so that the transistor 16 of the control switch 68 is nonconductive. When the transistor 16 is nonconductive, the phase detecting circuit 60 is disabled and the generation of the detection signal currents Ia and Ib is inhibited.

The pulse signal S1 can be generated by various known circuits. A sync pulse signal may be used as the pulse signal S1. FIG. 10 shows one example of circuits for generating the sync pulse signal S1. In FIG. 10, a signal generator 215 includes a detector 209, a sync separator 211, and a wave shaper 213. The detector 209 derives the envelope of the input video IF signal. The sync separator 211 separates a sync signal from the output signal of the detector 209. The wave shaper 213 converts the separated sync signal into the sync pulse signal S1.

DESCRIPTION OF THE SECOND PREFERRED EMBODIMENT

Figure 4:
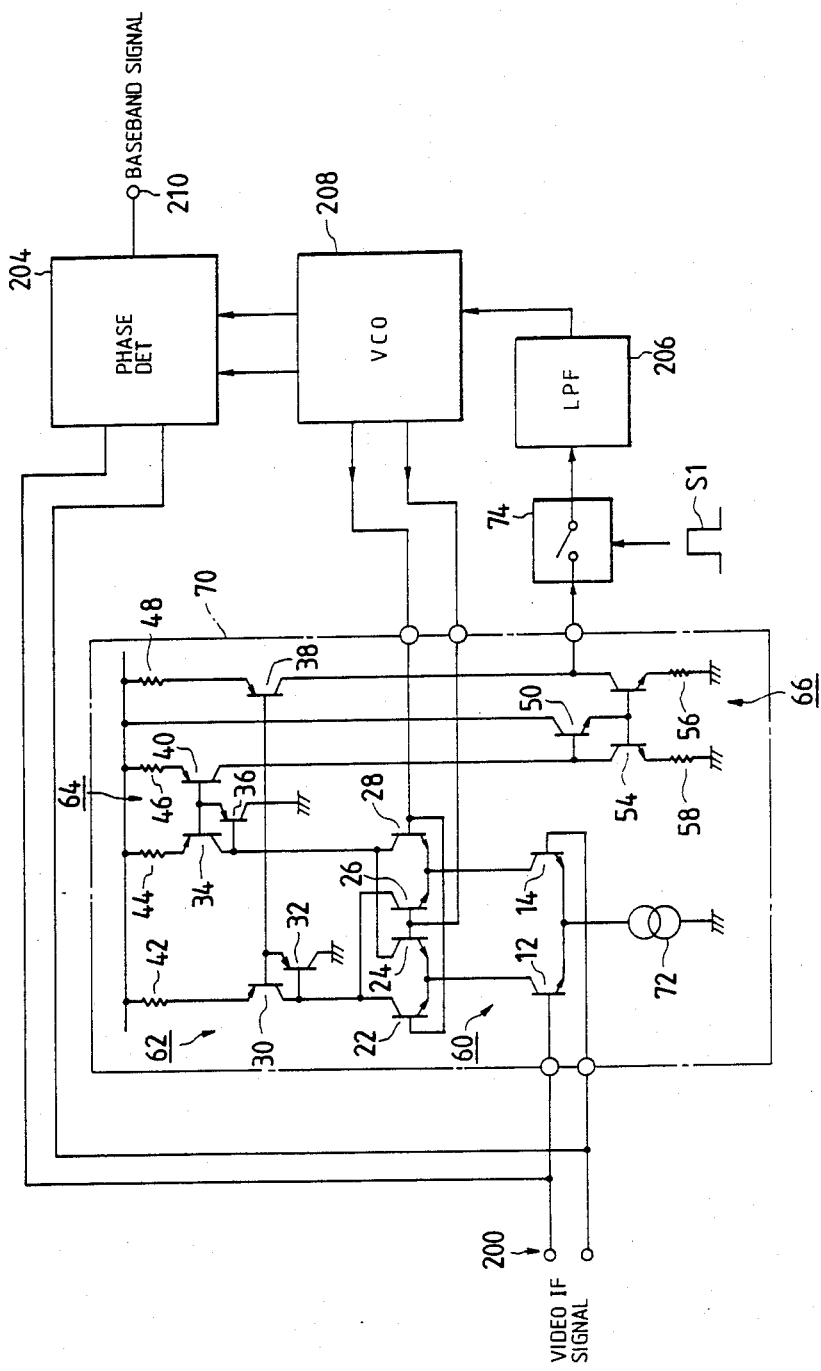
FIG. 4 is a diagram of a video IF signal detector according to a second embodiment of this invention.

FIG. 4 shows a second embodiment of this invention which is similar to the embodiment of FIGS. 2 and 3 except for structural changes explained hereinafter. In the embodiment of FIG. 4, a phase detector 70 corresponding to the phase detector 10 of FIG. 3 uses a current regulator 72 in place of the control switch 68 (see FIG. 3). Specifically, the emitters of the transistors 12 and 14 of the phase detecting circuit 60 is grounded via the current regulator 72. In the embodiment of FIG. 4, a control switch 74 is connected between the phase detector 70 and the LPF 206. The control switch 74 is closed and opened in response to the pulse signal S1.

The phase detecting circuit 60 of the phase detector 70 remains activated independent of the pulse signal S1. During the retrace periods, the control switch 74 is closed by the pulse signal S1 so that the phase detector 70 is coupled to the LPF 206. Therefore, during the retrace periods, the output signal from the phase detector 70 is fed to the LPF 206 and the PLL operates normally. In this case, the oscillation of the VCO 208 is controlled in accordance with the video IF signal. During the other periods, the control switch 74 is opened by the pulse signal S1 so that the phase detector 70 is uncoupled from the LPF 206 and that the feed of the output signal from the phase detector 70 to the LPF 206 is inhibited. In this case, the PLL moves out of the normal operation mode but the VCO 208 continues to oscillate in response to the output signal from the LPF 206. As understood from the previous description, the oscillation of the VCO 208 is kept independent of the output signal from the phase detector 70 which occurs during the periods other than the retrace periods. In other words, the oscillation of the VCO 208 is controlled in accordance with only the output signal from the phase detector 70 which occurs during the retrace periods.

DESCRIPTION OF THE THIRD PREFERRED EMBODIMENT

Figure 5:
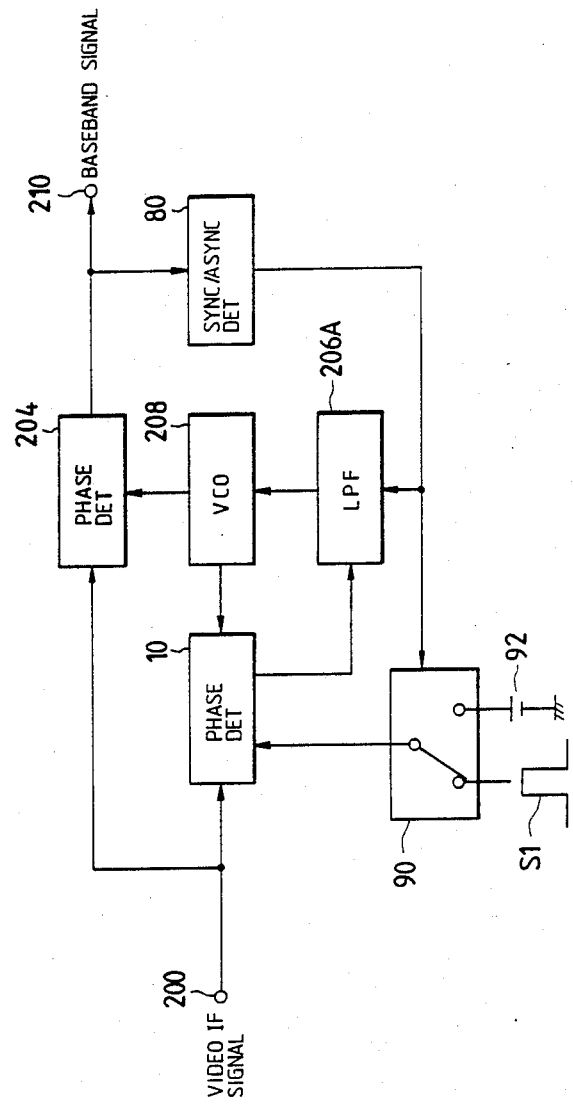
FIG. 5 is a block diagram of a video IF signal detector according to a third embodiment of this invention.
Figure 6:
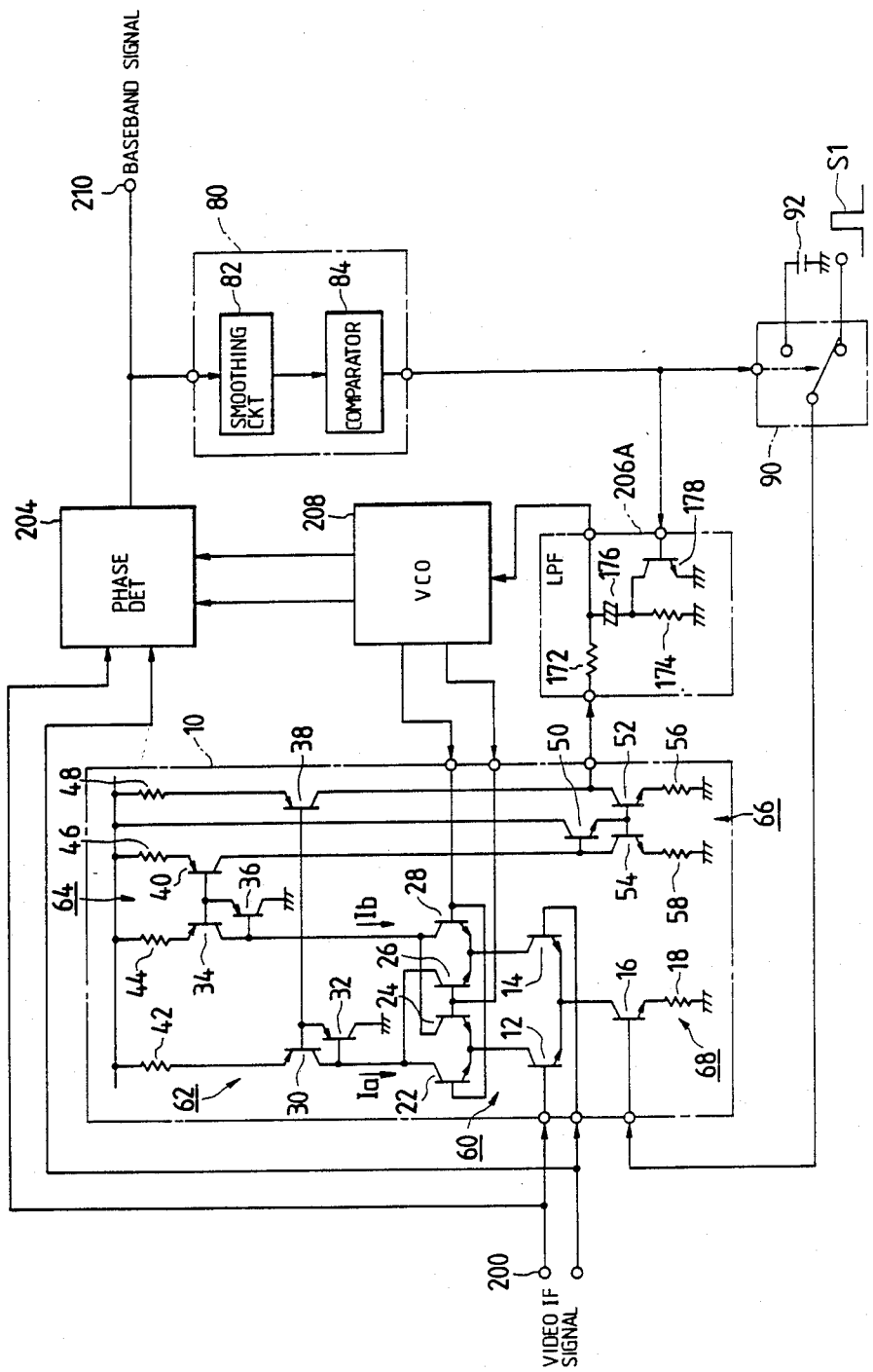
FIG. 6 is a diagram of the video IF signal detector of FIG. 5.

FIGS. 5 and 6 show a third embodiment of this invention which is similar to the embodiment of FIGS. 2 and 3 except for structural changes explained hereinafter. The embodiment of FIGS. 5 and 6 uses a modified LPF 206A in place of the LPF 206 (see FIG. 2). In addition, the embodiment of FIGS. 5 and 6 includes a sync/async detector 80, a switch 90, and a constant dc voltage source 92. The sync/async detector 80 detects whether or not the PLL locking is established on the basis of the output signal from the phase detector 204. The sync/async detector 80 generates a control signal depending on whether or not the PLL is locked. The control signal is outputted from the sync/async detector 80 to the LPF 206A and the switch 90. The time constant of the LPF 206A is changed between a large value and a small value in response to the control signal from the sync/async detector 80. The voltage source 92 applies a continuous H-level signal to the switch 90. The switch 90 also receives the pulse signal S1. The switch 90 selects one of the continuous H-level signal and the pulse signal S1 in response to the control signal from the sync/async detector 80, and feeds the selected signal to the phase detector 10.

Figure 8:
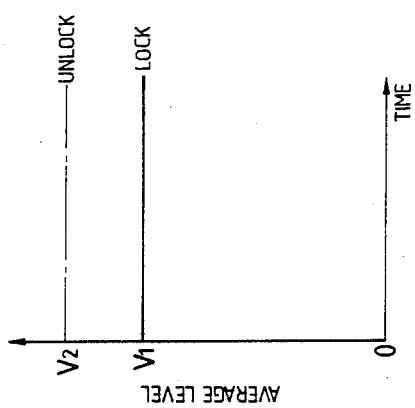
FIG. 8 is a time-domain diagram of the average levels of a video signal which occur when locking is established and unestablished respectively.
Figure 7:
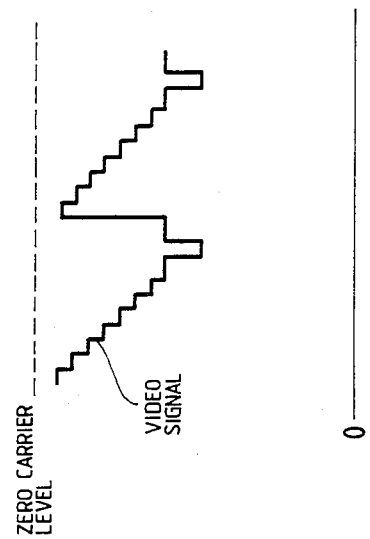
FIG. 7 is a level diagram of the phase detector output with the waveform of a video signal which occurs when locking is established.

The output of the phase detector 204 is shown in FIG. 7. In this figure, "zero carrier level" indicates the output level corresponding to no input signal condition. As shown in FIG. 7, under normally receiving conditions where an RF television signal is stably received and the PLL locking is established, the output of the phase detector 204 varies in a range below the zero carrier level. Under such normally receiving conditions, the average of the level of the video signal is equal to a small value V1 shown in FIG. 8. Under conditions where the PLL locking is unestablished by the unstable reception of an RF television signal or the change of the receiving television channel, the level of the output fluctuates around the zero carrier level so that the average of the output is equal to a large value V2 shown in FIG. 8.

As shown in FIG. 6, the sync/async detector 80 includes a smoothing circuit 82 and a comparator 84. The smoothing circuit 82 receives the baseband video signal from the phase detector 204 and smooths the baseband video signal into an average level. The comparator 84 compares the average level with a reference level which extends between the small value V1 and the large value V2 of FIG. 8. The comparator 84 outputs a control signal which depends on the result of the comparison between the average level and the reference level. Specifically, the control signal assumes an H-level when the average level is smaller than the reference level, that is, when the PLL locking is established. The control signal assumes an L-level when the average level is not smaller than the reference level, that is, when the PLL locking is unestablished. The control signal from the comparator 84 is fed to the LPF 206A and the switch 90.

The LPF 206A includes resistors 172 and 174, a capacitor 176, and a transistor 178. The resistors 172 and 174, and the capacitor 176 are connected to compose an RC network determining the time constant of the LPF 206A. The transistor 178 composes a switch for changing the time constant of the LPF 206A. Specifically, one end of the resistor 172 is connected to the output terminal of the phase detector 10. The other end of the resistor 172 is connected to one end of the capacitor 176. The junction between the resistor 172 and the capacitor 176 is connected to the input terminal of the VCO 208. The other end of the capacitor 176 is connected to the collector of the transistor 178 and also one end of the resistor 174. The emitter of the transistor 178 and the other end of the resistor 174 are grounded. The base of the transistor 178 is subjected to the control signal from the sync/async detector 80. When the PLL locking is established, that is, when the control signal from the sync/async detector 80 assumes the H-level, the transistor 178 shortcircuits the resistor 174 to the ground so that the time constant of the LPF 206A is changed to a large value. When the PLL locking is unestablished, that is, when the control signal from the sync/async detector 80 assumes the L-level, the transistor 178 unshunts the resistor 174 from the ground so that the time constant of the LPF 206A is changed to a small value.

The movable contact of the switch 90 is connected to the base of the transistor 16 within the phase detector 10. A first fixed contact of the switch 90 receives the continuous H-level signal from the voltage source 92. A second fixed contact of the switch 90 is subjected to the pulse signal S1. The control terminal of the switch 90 receives the control signal from the sync/async detector 80. When the sync is established, that is, when the control signal from the sync/async detector 80 assumes the H-level, the switch 90 selects the pulse signal S1 and transmits the pulse signal S1 to the phase detector 10 so that the phase detector 10 is enabled and disabled in response to the pulse signal S1. When the PLL locking is unestablished, that is, when the control signal from the sync/async detector 80 assumes the L-level, the switch 90 selects the continuous H-level signal and transmits the continuous H-level signal to the phase detector 10 so that the phase detector 10 is continuously enabled.

As described previously, when the PLL locking is unestablished, that is, when the control signal from the sync/async detector 80 assumes the L-level, the time constant of the LPF 206A is changed to a small value and the phase detector 10 is continuously enabled. The small time constant of the LPF 206A and the continuous operation of the phase detector 10 enable the oscillation of the VCO 208 to be quickly locked up with respect to the input video IF signal.

DESCRIPTION OF THE FOURTH PREFERRED EMBODIMENT

FIG. 9 shows a fourth embodiment of this invention which is similar to the embodiment of FIGS. 5-8 except for structural changes explained hereinafter. The embodiment of FIG. 9 uses a phase detector 70 in place of the phase detector 10 (see FIG. 6). The internal design of the phase detector 70 is similar to that shown in FIG. 4. In the embodiment of FIG. 9, a control switch 74 is connected between the phase detector 70 and the LPF 206A. The movable contact of the switch 90 is connected to the control terminal of the switch 74.

When the sync is established, that is, when the control signal from the sync/async detector 80 assumes the H-level, the switch 90 selects the pulse signal S1 and transmits the pulse signal S1 to the switch 74 so that the switch 74 is closed and opened in response to the pulse signal S1. Specifically, during the retrace periods, the control switch 74 is closed by the pulse signal S1 so that the phase detector 70 is coupled to the LPF 206A. Therefore, during the retrace periods, the output signal from the phase detector 70 is fed to the LPF 206A and the PLL operates normally. In this case, the oscillation of the VCO 208 is controlled in accordance with the video IF signal. During the other periods, the control switch 74 is opened by the pulse signal S1 so that the phase detector 70 is uncoupled from the LPF 206A and that the feed of the output signal from the phase detector 70 to the LPF 206A is inhibited. In this case, the PLL moves out of the normal operation mode but the VCO 208 continues to oscillate in response to the output signal from the LPF 206A.

When the PLL locking is unestablished, that is, when the control signal from the sync/async detector 80 assumes the L-level, the switch 90 selects the continuous H-level signal and transmits the continuous H-level signal to the switch 74 so that the switch 74 is continuously closed by the continupus H-level signal. In this case, the phase detector 70 remains coupled to the LPF 206A even during the periods other than the retrace periods. In addition, when the PLL locking is unestablished, the time constant of the LPF 206A is changed to the small value. The small time constant of the LPF 206A and the continuous coupling between the phase detector 70 and the LPF 206A enable the oscillation of the VCO 208 to be quickly locked up with respect to the input video IF signal.

What is claimed is:

1. A video IF signal detector comprising:
   a first phase detector detecting a phase difference between an input video IF signal and a first reference signal;
   a low pass filter acting on an output signal from the first phase detector;
   a VCO generating the first reference signal and a second reference signal in response to an output signal from the low pass filter, the first reference signal and the second reference signal having a fixed phase relation with each other;
   wherein the first phase detector, the low pass filter, and the VCO compose a PLL;
   a second phase detector detecting a phase difference between the input video IF signal and the second reference signal and extracting a baseband video signal from the input video IF signal; and
   PLL control means for enabling the PLL during a first period where the input video IF signal is independent of display information, and for disabling the PLL during a second period where the input video IF signal represents the display information.

2. The video IF signal detector of claim 1 wherein the PLL control means comprises means for enabling the first phase detector during the first period, and for disabling the first phase detector during the second period.

3. The video IF signal detector of claim 1 wherein the PLL control means comprises means for coupling the first phase detector to the low pass filter during the first period, and for uncoupling the first phase detector from the low pass filter during the second period.

4. The video IF signal detector of claim 1 wherein the PLL control means comprises means for extracting a sync signal from the input video IF signal, and means for enabling and disabling the PLL in response to the extracted sync signal.

5. The video IF signal detector of claim 1 further comprising locking-condition detecting means for detecting that locking related to the input video IF signal is unestablished, and means for continuously enabling the PLL regardless of an operation of the PLL control means when said locking-condition detecting means detects that the locking is unestablished.

6. The video IF signal detector of claim 1 further comprising means for changing a time constant of the low pass filter in response to whether or not said locking-condition detecting means detects that the locking is unestablished.

* * * * *